United States Patent
Nishii et al.

(10) Patent No.: US 10,557,377 B2
(45) Date of Patent: Feb. 11, 2020

(54) TURBOCHARGER

(71) Applicant: IHI Corporation, Koto-ku (JP)

(72) Inventors: Shunsuke Nishii, Tokyo (JP); Shinichi Kaneda, Tokyo (JP); Kenji Bunno, Tokyo (JP); Yutaka Uneura, Tokyo (JP)

(73) Assignee: IHI Corporation, Koto-ku (JP)

( * ) Notice: Subject to any disclaimer, the term of this patent is extended or adjusted under 35 U.S.C. 154(b) by 0 days.

(21) Appl. No.: 16/126,087

(22) Filed: Sep. 10, 2018

(65) Prior Publication Data

US 2019/0032515 A1    Jan. 31, 2019

Related U.S. Application Data

(63) Continuation of application No. PCT/JP2017/013032, filed on Mar. 29, 2017.

(30) Foreign Application Priority Data

Mar. 31, 2016 (JP) .................. 2016-070560

(51) Int. Cl.
    *F16C 33/10*      (2006.01)
    *F01D 25/18*      (2006.01)
    (Continued)

(52) U.S. Cl.
    CPC .......... *F01D 25/183* (2013.01); *F01D 25/16* (2013.01); *F16C 17/04* (2013.01);
    (Continued)

(58) Field of Classification Search
CPC .... F01D 25/186; F01D 25/16; F16C 2360/24; F16C 17/04; F16C 17/10; F16C 33/1025; F16C 33/74
See application file for complete search history.

(56) References Cited

U.S. PATENT DOCUMENTS

| | | | |
|---|---|---|---|
| 4,523,763 A * | 6/1985 | Asano | .................. F01D 25/183 277/419 |
| 6,220,829 B1 | 4/2001 | Thompson et al. | |

(Continued)

FOREIGN PATENT DOCUMENTS

| | | |
|---|---|---|
| AU | 55568/80 A | 9/1980 |
| CN | 104420899 A | 3/2015 |

(Continued)

OTHER PUBLICATIONS

International Preliminary Report on Patentability and Written Opinion dated Oct. 11, 2018 in PCT/JP2017/013032 (submitting English translation only).

(Continued)

*Primary Examiner* — Thomas R Hannon
(74) *Attorney, Agent, or Firm* — Oblon, McClelland, Maier & Neustadt, L.L.P.

(57) ABSTRACT

A turbocharger includes: a bearing housing (housing); a bearing disposed in the housing and having a thrust bearing surface; and a partition wall portion assembled to the housing, the partition wall portion including an inclined surface positioned on an outer side in a radial direction of the thrust bearing surface, extending at least vertically above the thrust bearing surface, and inclined with respect to a direction perpendicular to the axial direction of a shaft.

19 Claims, 4 Drawing Sheets

(51) Int. Cl.
  *F01D 25/16* (2006.01)
  *F16C 17/04* (2006.01)
  *F16C 33/74* (2006.01)

(52) U.S. Cl.
  CPC .......... *F16C 33/1025* (2013.01); *F16C 33/74* (2013.01); *F05D 2220/40* (2013.01); *F05D 2240/14* (2013.01); *F05D 2240/50* (2013.01); *F05D 2240/55* (2013.01); *F05D 2260/98* (2013.01); *F16C 2360/24* (2013.01)

(56) References Cited

U.S. PATENT DOCUMENTS

| | | |
|---|---|---|
| 2010/0139270 A1 | 6/2010 | Koch et al. |
| 2010/0218499 A1 | 9/2010 | Shibui et al. |
| 2015/0176593 A1* | 6/2015 | Dayalan ................. F16C 17/10 415/1 |
| 2015/0322852 A1 | 11/2015 | Ward |
| 2016/0160872 A1 | 6/2016 | Kelly et al. |
| 2017/0342998 A1* | 11/2017 | Uneura .............. G16C 33/1065 |
| 2018/0156268 A1* | 6/2018 | Bunno ................... F16C 32/06 |
| 2018/0231053 A1* | 8/2018 | Uneura .................. F16C 17/10 |

FOREIGN PATENT DOCUMENTS

| | | |
|---|---|---|
| CN | 105378247 A | 3/2016 |
| DE | 10 2014 217 053 A1 | 3/2015 |
| JP | 53-165911 U | 12/1978 |
| JP | 58-183822 A | 10/1983 |
| JP | 61-107935 U | 7/1986 |
| JP | 6-317171 | 11/1994 |
| JP | 9-41982 | 2/1997 |
| JP | 11-82037 | 3/1999 |
| JP | 2007-321698 | 12/2007 |
| JP | 2013-87725 | 5/2013 |
| JP | 2015-48755 | 3/2015 |
| JP | 2016-525183 | 8/2016 |
| KR | 10-2016-0040212 | 4/2016 |
| WO | WO 2008/042698 A1 | 4/2008 |
| WO | WO 2012/027183 A2 | 3/2012 |
| WO | WO 2015/013114 A1 | 1/2015 |
| WO | WO 2016/098230 A1 | 6/2016 |

OTHER PUBLICATIONS

International Search Report dated May 30, 2017 in PCT/JP2017/013032, filed on Mar. 29, 2017 (with English Translation).
Written Opinion dated May 30, 2017 in PCT/JP2017/013032, filed on Mar. 29, 2017.
German Office Action dated May 22, 2019 in German Patent Application No. 11 2017 001 796.3 (with English translation), 20 pages.
"Gerthsen Physik", Springer, ISBN 10 3-540-25421-8, Nov. 23, 2009, pp. 16-18 and 54-57 with cover pages (with partial unedited computer generated English translation).
Niemann, G., "Maschinen-elemente: Band I Konstruktion und Berechnung von Verbindungen, Lagern, Wellen", Springer-Verlag Berlin Heidelberg GmbH 1981, ISBN 978-3-662-26969-5, pp. 347-358 with cover pages (with partial unedited computer generated English translation).
Office Action dated Jul. 23, 2019 in Japanese Patent Application No. 2018-509373, 5 pages (with English translation).

* cited by examiner

TURBOCHARGER

CROSS REFERENCE TO RELATED APPLICATIONS

This application is a continuation application of International Application No. PCT/JP2017/013032, filed on Mar. 29, 2017, which claims priority to Japanese Patent Application No. 2016-070560, filed on Mar. 31, 2016, the entire contents of which are incorporated by reference herein.

BACKGROUND ART

Technical Field

The present disclosure relates to a turbocharger including a bearing having a thrust bearing surface.

Related Art

In the related art, turbochargers in which a shaft is pivotally supported by a bearing housing in a freely rotatable manner are known. One end of the shaft is provided with a turbine impeller. The other end of the shaft is provided with a compressor impeller. Such a turbocharger is connected to an engine. The turbine impeller rotates by exhaust gas discharged from the engine. The rotation of the turbine impeller causes the compressor impeller to rotate via the shaft. In this manner, the turbocharger compresses the air along with the rotation of the compressor impeller and delivers the air to the engine.

In the turbocharger, a bearing formed with a thrust bearing surface is mounted. The thrust bearing surface receives a thrust load acting on the shaft. For example, in a semi-floating bearing described in Patent Literature 1, an end surface forms a thrust bearing surface. The thrust bearing surface receives a thrust load from an oil thrower member provided in a shaft. In Patent Literature 1, a partition wall portion (lid member) is provided on an outer side in the radial direction of the oil thrower member. The partition wall portion divides a space from the thrust bearing surface to a compressor impeller. The partition wall portion prevents lubricating oil scattered from the thrust bearing surface from flowing toward the compressor impeller side.

CITATION LIST

Patent Literature

Patent Literature 1: Japanese Patent Application Laid-Open No. JP 2015-048755

SUMMARY

Technical Problem

Lubricating oil having lubricated a bearing is discharged from an oil discharge port. The oil discharge port is provided below a partition wall portion. However, if the amount of lubricating oil is excessively increased, an oil level of the lubricating oil before being discharged from the oil discharge port rises below the partition wall portion. For this reason, development of a technology for improving the oil draining property is desired.

It is an object of the present disclosure to provide a turbocharger capable of improving the oil draining property.

Solution to Problem

In order to solve the above problem, a turbocharger according to one aspect of the present disclosure includes: a housing; a bearing disposed in the housing and having a thrust bearing surface; and a partition wall portion assembled to the housing, the partition wall portion including an inclined surface positioned on an outer side in a radial direction of the thrust bearing surface, extending at least vertically above the thrust bearing surface, and inclined with respect to a direction perpendicular to the axial direction of a shaft.

The inclined surface may be inclined in such a direction as to extend radially outward toward the bearing.

A groove formed in the housing and facing the inclined surface in the axial direction of the shaft may be further provided.

An oil discharge port formed in the housing and positioned on an imaginary extension line in contact with an outer diameter end portion of the inclined surface positioned vertically below the shaft may be further provided.

An outer diameter wall portion extending outward in the radial direction from the inclined surface in the partition wall portion and a first cutout portion formed on a vertically lower side lower than a center of the shaft in the outer diameter wall portion.

A seal plate portion spaced apart from the partition wall portion on an opposite side of the bearing may be further provided.

The partition wall portion and the seal plate portion may be integrally formed.

A middle portion provided between the partition wall portion and the seal plate portion and a second cutout portion formed in the middle portion in a vertically lower side thereof lower than the center of the shaft may be further provided.

Effects of Disclosure

According to the present disclosure, it is possible to improve the oil draining property.

DESCRIPTION OF EMBODIMENTS

Embodiments of the present disclosure will be described in detail below with reference to the accompanying drawings. Dimensions, materials, other specific numerical values, and the like illustrated in such embodiments are merely examples for facilitating understanding of the disclosure, and the present disclosure is not limited thereby except for a case where it is specifically mentioned. Note that, in the present specification and the drawings, elements having substantially the same function and structure are denoted by the same symbol, and redundant explanations are omitted. Components not directly related to the present disclosure are not illustrated.

Figure 1:
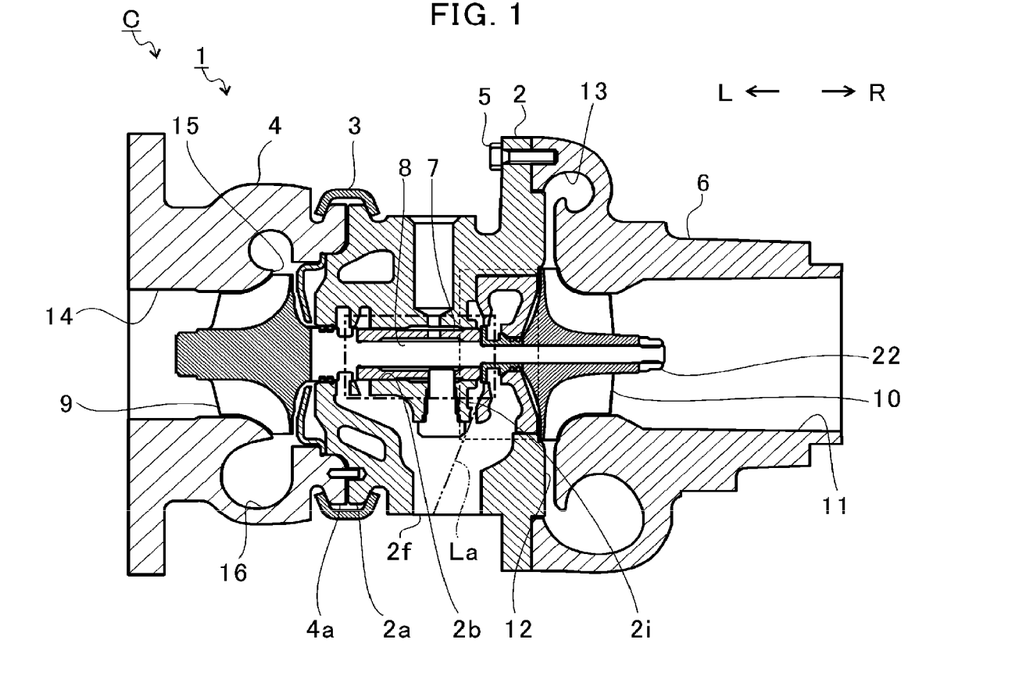
FIG. 1 is a schematic cross-sectional view of a turbocharger.

FIG. 1 is a schematic cross-sectional view of a turbocharger C. Hereinafter, descriptions are given assuming that a direction of an arrow L illustrated in FIG. 1 is the left side of the turbocharger C. Descriptions are given assuming that a direction of an arrow R illustrated in FIG. 1 is the right side of the turbocharger C. As illustrated in FIG. 1, the turbocharger C includes a turbocharger main body 1. The turbocharger main body 1 includes a bearing housing 2 (housing). A turbine housing 4 is connected to the left side of the bearing housing 2 by a fastening mechanism 3. A compressor housing 6 is connected to the right side of the bearing housing 2 by a fastening bolt 5. The bearing housing 2, the turbine housing 4, and the compressor housing 6 are integrated.

A protrusion 2a is provided on the outer circumferential surface of the bearing housing 2. The protrusion 2a is provided in the vicinity of the turbine housing 4. The protrusion 2a protrudes in a radial direction of the bearing housing 2. Moreover, a protrusion 4a is provided on the outer circumferential surface of the turbine housing 4. The protrusion 4a is provided in the vicinity of the bearing housing 2. The protrusion 4a protrudes in a radial direction of the turbine housing 4. The bearing housing 2 and the turbine housing 4 are fixed to each other by fastening the protrusions 2a and 4a by the fastening mechanism 3. The fastening mechanism 3 is formed by, for example, a G coupling which clamps the protrusions 2a and 4a.

A bearing hole 2b is formed in the bearing housing 2. The bearing hole 2b penetrates through the turbocharger C in the horizontal direction. A bearing 7 is provided in the bearing hole 2b. A shaft 8 is pivotally supported by the bearing 7 in a freely rotatable manner. At a left end portion of the shaft 8, a turbine impeller 9 is assembled. The turbine impeller 9 is accommodated in the turbine housing 4 in a freely rotatable manner. Furthermore, a compressor impeller 10 is assembled to a right end portion of the shaft 8. The compressor impeller 10 is accommodated in the compressor housing 6 in a freely rotatable manner.

An intake port 11 is formed in the compressor housing 6. The intake port 11 opens to the right side of the turbocharger C. The intake port 11 is connected to an air cleaner (not illustrated). Furthermore, in a state where the bearing housing 2 and the compressor housing 6 are connected by the fastening bolt 5, a diffuser flow passage 12 is formed. The diffuser flow passage 12 is formed by opposing surfaces of the bearing housing 2 and the compressor housing 6. The diffuser flow passage 12 pressurizes the air. The diffuser flow passage 12 is annularly formed outward from an inner side in the radial direction of the shaft 8. The diffuser flow passage 12 communicates with the intake port 11 via the compressor impeller 10 on the inner side in the above radial direction.

Furthermore, the compressor housing 6 includes a compressor scroll flow passage 13. The compressor scroll flow passage 13 is annular. The compressor scroll flow passage 13 is positioned on an outer side in the radial direction of the shaft 8 with respect to the diffuser flow passage 12. The compressor scroll flow passage 13 communicates with an intake port of the engine (not illustrated). The compressor scroll flow passage 13 also communicates with the diffuser flow passage 12. When the compressor impeller 10 rotates, therefore, the air is sucked into the compressor housing 6 from the intake port 11. The sucked air is accelerated by the action of the centrifugal force in the process of flowing through blades of the compressor impeller 10. The accelerated air is pressurized by the diffuser flow passage 12 and the compressor scroll flow passage 13. The pressurized air is guided to the intake port of the engine.

A discharge port 14 is formed in the turbine housing 4. The discharge port 14 opens to the left side of the turbocharger C. The discharge port 14 is connected to an exhaust gas purification device (not illustrated). In the turbine housing 4, a flow passage 15 and a turbine scroll flow passage 16 are provided. The turbine scroll flow passage 16 is annular. The turbine scroll flow passage 16 is positioned on an outer side in the radial direction of the turbine impeller 9 with respect to the flow passage 15. The turbine scroll flow passage 16 communicates with a gas inlet port (not illustrated). Exhaust gas discharged from an exhaust manifold of the engine (not illustrated) is guided to the gas inlet port. The turbine scroll flow passage 16 also communicates with the turbine impeller 9 via the flow passage 15 described above. Therefore, the exhaust gas guided from the gas inlet port to the turbine scroll flow passage 16 is guided to the discharge port 14 via the flow passage 15 and the turbine impeller 9. The exhaust gas guided to the discharge port 14 rotates the turbine impeller 9 in the process of flowing therethrough.

Then, the turning force of the turbine impeller 9 is transmitted to the compressor impeller 10 via the shaft 8. As described above, the air is pressurized by the turning force of the compressor impeller 10 and guided to the intake port of the engine.

Figure 2:
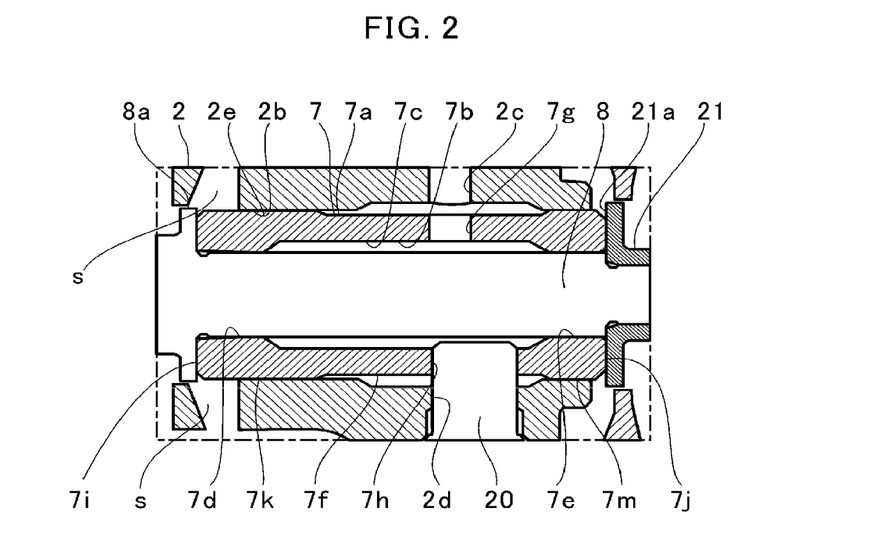
FIG. 2 is a view of a one-dot chain line part extracted from FIG. 1.

FIG. 2 is a view extracted from a one-dot chain line part of FIG. 1. As illustrated in FIG. 2, an oil passage 2c is formed in the bearing housing 2. The oil passage 2c penetrates from the outside of the bearing housing 2 to the bearing hole 2b. Lubricating oil flows into the bearing hole 2b from the oil passage 2c. A bearing 7 is disposed in the bearing hole 2b. An insertion hole 7b is formed in the main body portion 7a of the bearing 7. The insertion hole 7b penetrates in the axial direction of the shaft 8 (hereinafter simply referred to as the axial direction). The shaft 8 is inserted through the insertion hole 7b. On an inner circumferential surface 7c of the insertion hole 7b, two bearing surfaces 7d and 7e are formed. The bearing surfaces 7d and 7e are spaced apart in the axial direction.

Of the main body portion 7a, an end surface (thrust bearing surface 7i which will be described later) on the turbine impeller 9 side (left side in FIG. 2) protrudes from the bearing hole 2b to the turbine impeller 9 side. A space s for scattering the lubricating oil is formed radially outward from the thrust bearing surface 7i. The space s communicates with an oil discharge port 2f side vertically below the main body portion 7a and vertically below the bearing 7. Here, in the space s, an oil passage (not illustrated) may communicate vertically above the main body portion 7a. In this case, lubricating oil is guided from the oil passage (not illustrated) to the space s.

A part of the bearing surface 7d protrudes from the bearing hole 2b toward the turbine impeller 9. A part of the bearing surface 7d is positioned in the space s (on an inner side in the radial direction of the space s). In the case where an entirety of the main body portion 7a is accommodated in the bearing hole 2b, the heat dissipation property in the vicinity of the bearing surface 7d of the main body portion 7a is deteriorated since the main body portion 7a is covered by the bearing housing 2. A part of the bearing surface 7d is positioned in the space s (on the inner side in the radial direction of the space s), whereby the heat dissipation property of the main body portion 7a in the vicinity of the bearing surface 7d is improved. Furthermore, for example, in the case where an oil passage that bifurcates from the oil passage 2c and guides the lubricating oil directly to the space s is provided, the main body portion 7a is cooled by the lubricating oil, and thus the cooling performance of the bearing surface 7d is improved. Here, the case where a part of the bearing surface 7d on the turbine impeller 9 side protrudes from the bearing hole 2b has been described. However, the bearing surface 7e on the compressor impeller 10 side may protrude from the bearing hole 2b (toward the compressor impeller 10).

A part of the lubricating oil supplied to the bearing hole 2b passes through an oil hole 7g and flows into the inner circumferential surface 7c of the main body portion 7a. The oil hole 7g penetrates through the main body portion 7a from the inner circumferential surface 7c to the outer circumferential surface 7f. The lubricating oil flowed in spreads horizontally in FIG. 2 from the oil hole 7g. The spread lubricating oil is supplied to clearances between the shaft 8 and each of the bearing surfaces 7d and 7e. The shaft 8 is pivotally supported by the oil film pressure of the lubricating oil supplied to the clearance between the shaft 8 and each of the bearing surfaces 7d and 7e.

A through hole 7h is further provided in the main body portion 7a. The through hole 7h penetrates from the inner circumferential surface 7c to the outer circumferential surface 7f. A pin hole 2d is formed in the bearing housing 2. The pin hole 2d is formed at a portion facing the through hole 7h. The pin hole 2d penetrates through a wall portion forming the bearing hole 2b. A positioning pin 20 is fitted to the pin hole 2d from the lower side in FIG. 2. The tip of the positioning pin 20 is inserted into the through hole 7h of the bearing 7. The positioning pin 20 regulates rotation and movement in the axial direction of the bearing 7.

An oil thrower member 21 is attached to the shaft 8. The oil thrower member 21 is arranged on the right side (the compressor impeller 10 side) in FIG. 2 with respect to the main body portion 7a. The oil thrower member 21 is an annular member. The oil thrower member 21 scatters the lubricating oil flowing to the compressor impeller 10 side along the shaft 8 to the outer side in the radial direction. That is, leakage of lubricating oil to the compressor impeller 10 side is suppressed by the oil thrower member 21.

The oil thrower member 21 is axially facing the main body portion 7a. Of the oil thrower member 21, an outer diameter of an opposing surface 21a (bearing-receiving surface) facing the main body portion 7a is larger than an inner diameter of the bearing surface 7e. The outer diameter is also larger than the outer diameter of the main body portion 7a.

The shaft 8 has a large diameter portion 8a. The large diameter portion 8a has an outer diameter larger than an inner diameter of the bearing surface 7d of the main body portion 7a. The outer diameter of the large diameter portion 8a is also larger than the outer diameter of the main body portion 7a. The large diameter portion 8a is positioned on the left side (the turbine impeller 9 side) in FIG. 2 with respect to the main body portion 7a. The large diameter portion 8a axially faces the main body portion 7a.

In this manner, movement of the main body portion 7a in the axial direction is restricted by the positioning pin 20. The main body portion 7a is interposed between the oil thrower member 21 and the large diameter portion 8a in the axial direction. Lubricating oil is supplied to a clearance between the main body portion 7a and the oil thrower member 21 and to a clearance between the main body portion 7a and the large diameter portion 8a. When the shaft 8 moves in the axial direction, the oil thrower member 21 or the large diameter portion 8a is supported by the oil film pressure with respect to the main body portion 7a. That is, in the bearing 7, both end surfaces in the axial direction of the main body portion 7a form thrust bearing surfaces 7i and 7j. The thrust bearing surfaces 7i and 7j receive a thrust load.

Furthermore, damper portions 7k and 7m are formed on each of both axial end sides of the outer circumferential surface of the main body portion 7a. The damper portions 7k and 7m suppress vibration of the shaft 8 by the oil film pressure of the lubricating oil supplied to the clearance with an inner circumferential surface 2e of the bearing hole 2b.

As illustrated in FIG. 1, in the bearing housing 2, an oil discharge port 2f is formed vertically below the bearing 7. The lubricating oil used for lubrication and suppression of vibration of the bearing 7 is discharged from the oil discharge port 2f.

Figure 3:
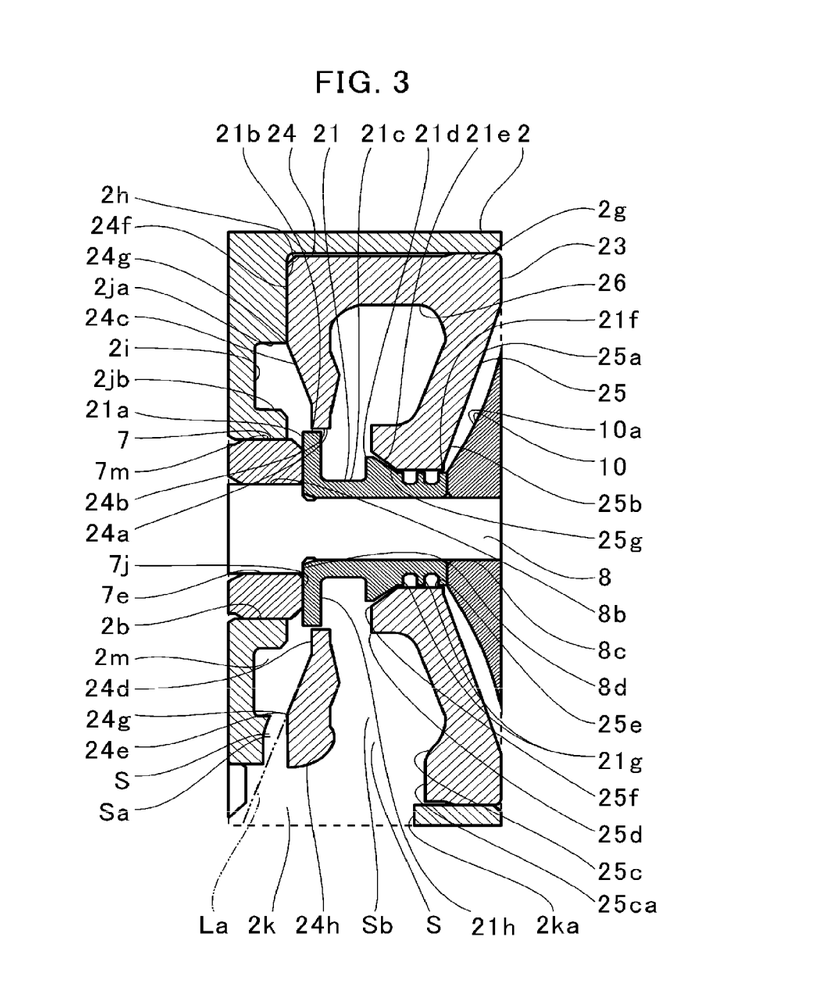
FIG. 3 is a view of a broken line part extracted from FIG. 1.

FIG. 3 is a view of a broken line part extracted from FIG. 1. As illustrated in FIG. 3, an accommodation hole 2g is formed in the bearing housing 2. The accommodation hole 2g is adjacent to a back surface 10a of the compressor impeller 10. One end of the bearing hole 2b opens on a bottom surface portion 2h of the accommodation hole 2g. The thrust bearing surface 7j formed at one end of the bearing 7 protrudes from the bottom surface portion 2h toward the compressor impeller 10.

The shaft 8 has a medium diameter portion 8b. The medium diameter portion 8b is a portion pivotally supported by the bearing surface 7e of the bearing 7. Furthermore, a small diameter portion 8c is formed on the compressor impeller 10 side of the shaft 8 with respect to the medium diameter portion 8b. Between the medium diameter portion 8b and the small diameter portion 8c, a step surface 8d is provided. The step surface 8d extends in the radial direction. The step surface 8d connects the medium diameter portion 8b and the small diameter portion 8c.

The oil thrower member 21 has a large protrusion 21b. The large protrusion 21b is annular. In the large protrusion 21b, an opposing surface 21a facing the thrust bearing surface 7j is formed. The large protrusion 21b protrudes radially outward from a main body portion 21c of the oil thrower member 21. The large protrusion 21b extends radially outward from the damper portion 7m of the bearing 7.

A small protrusion 21d is provided to the main body portion 21c on the compressor impeller 10 side with the large protrusion 21b. The small protrusion 21d has a smaller diameter than the large protrusion 21b. In the small protrusion 21d, an inclined surface 21e is formed. The inclined surface 21e has a smaller diameter toward the compressor impeller 10. For example, two ring grooves 21g are provided side by side on a tip portion 21f on the compressor impeller 10 side with respect to the small protrusion 21d. The ring grooves 21g are annular. A seal ring (not illustrated) is provided in a ring groove 21g.

The small diameter portion 8c of the shaft 8 is inserted through the oil thrower member 21. The large protrusion 21b (opposing surface 21a) of the oil thrower member 21 abuts against the step surface 8d of the shaft 8. The compressor impeller 10, through which the shaft 8 is inserted, abuts against the tip portion 21f of the oil thrower member 21. The oil thrower member 21 and the compressor impeller 10 are held by the axial force generated between a fastening member 22 (see FIG. 1) and the step surface 8d. When the shaft 8 rotates, the oil thrower member 21 and the compressor impeller 10 rotate together with the shaft 8.

In this manner, the oil thrower member 21 is provided to the shaft 8. The opposing surface 21a of the oil thrower member 21 faces the thrust bearing surface 7j. Here, the case where the bearing-receiving surface (opposing surface 21a) facing the thrust bearing surface 7j is provided separately from the shaft 8 has been described. However, like the large diameter portion 8a, the bearing-receiving surface to face the thrust bearing surface 7j may be formed in the shaft 8.

A seal partition member 23 is disposed radially outside the oil thrower member 21. The seal partition member 23 is, for example, press-fitted into the accommodation hole 2g of the bearing housing 2. The seal partition member 23 is attached to the bearing housing 2. Here, for example, the axial length of a part of the seal partition member 23 that is press-fitted into the accommodation hole 2g may not extend to an inner surface 25c of a seal plate portion 25, which will be described later. As illustrated in FIG. 3, the seal partition member 23 may be press-fitted only to a partial region of the accommodation hole 2g (seal partition member 23) on the compressor impeller 10 side. That is, of an outer circumferential surface of the seal partition member 23, the inner surface 25c (bearing 7) side is slightly recessed radially inward. Of the outer circumferential surface of the seal partition member 23, the inner surface 25c (bearing 7) side is spaced apart (has a clearance) from the accommodation hole 2g of the bearing housing 2. In this case, reducing the press-fitted area of the seal partition member 23 allows press-fitting work to be performed stably.

Figure 4A:
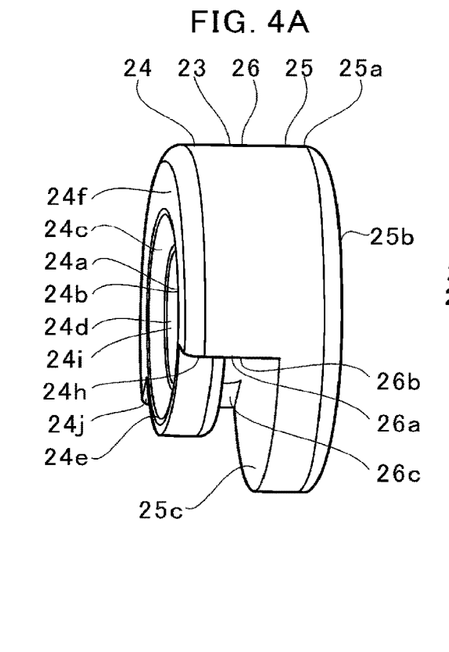
FIG. 4A is a perspective view of a seal partition member.
Figure 4B:
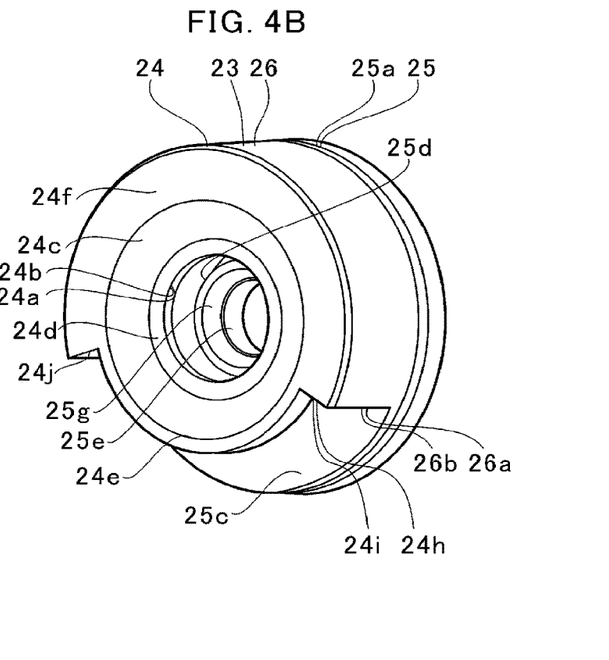
FIG. 4B is a perspective view of the seal partition member when viewed from a direction different from that of FIG. 4A.

FIG. 4A is a perspective view of the seal partition member 23. FIG. 4 (b) is a perspective view of the seal partition member 23 when viewed from a direction different from that in FIG. 4A. As illustrated in FIGS. 3, 4A, and 4B, the seal partition member 23 has a partition wall portion 24, a seal plate portion 25, and a middle portion 26. The middle portion 26 is positioned between the partition wall portion 24 and the seal plate portion 25. The partition wall portion 24, the seal plate portion 25, and the middle portion 26 are integrally formed.

The partition wall portion 24 has a large diameter hole 24a. The large protrusion 21b of the oil thrower member 21 is inserted through the large diameter hole 24a. An inner circumferential surface 24b of the large diameter hole 24a faces the large protrusion 21b in the radial direction. The opposing surface 21a of the large protrusion 21b is positioned closer to the bearing 7 than the large diameter hole 24a is. Furthermore, of the large protrusions 21b, an opposite surface 21h on the small protrusion 21d side is positioned inside the large diameter hole 24a. That is, the inner circumferential surface 24b of the large diameter hole 24a is positioned radially outside the opposite surface 21h of the large protrusion 21b.

In the partition wall portion 24, an inclined surface 24c is formed on the bearing 7 side. The inclined surface 24c is positioned radially outside the large diameter hole 24a. For example, the inclined surface 24c extends at least vertically above the thrust bearing surface 7j. A flat surface portion 24d is provided between the large diameter hole 24a and the inclined surface 24c. The flat surface portion 24d extends in the radial direction.

The inclined surface 24c is inclined in such a direction as to extend radially outward toward the bearing 7. That is, the inclined surface 24c is inclined with respect to the direction perpendicular to the axial direction (radial direction of the shaft 8). The inclined surface 24c is positioned radially outside the thrust bearing surface 7j. The inclined surface 24c faces the thrust bearing surface 7j in the radial direction.

Here, of the inclined surface 24c, an imaginary extension line La in contact with an outer diameter end portion 24e on the lower side (vertically lower side) in FIG. 3 is indicated by a two-dot chain line. As illustrated in FIG. 1, the oil discharge port 2f is positioned on this extension line La.

An outer diameter wall portion 24f is provided on an outer side in the radial direction of the inclined surface 24c. The outer diameter wall portion 24f abuts against the bottom surface portion 2h. That is, the outer diameter wall portion 24f extends radially outward from the inclined surface 24c. The outer diameter wall portion 24f extends in the radial direction of the shaft 8. A groove 2i is formed in the bottom surface portion 2h of the accommodation hole 2g of the bearing housing 2. The groove 2i faces the inclined surface 24c of the partition wall portion 24 in the axial direction. The groove 2i is positioned radially outside the bearing hole 2b. The groove 2i extends in the circumferential direction of the bearing hole 2b. The axial position (depth) of the groove 2i is, for example, within the range in which the bearing surface 7e extends in the axial direction. Of the groove 2i, an inner wall surface 2ja on the outer side in the radial direction abuts against an outer circumferential end 24g of the inclined surface 24c.

The groove 2i is positioned radially outside the large diameter hole 24a. The large protrusion 21b of the oil thrower member 21 inserted through the large diameter hole 24a is positioned on an inner side than the groove 2i in the radial direction. That is, in the radial direction, a part of the large protrusion 21b on an outer side faces the bottom surface portion 2h which is positioned on an inner side in the radial direction than the groove 2i in the axial direction.

As illustrated in FIGS. 4A and 4B, a first cutout portion 24h is formed at a vertically lower side of the outer diameter wall portion 24f. The first cutout portion 24h is positioned vertically lower than the center of the large diameter hole 24a (center of the shaft 8). On the outer diameter wall portion 24f, two tapered surfaces 24i and 24j are formed. The two tapered surfaces 24i and 24j are formed at cutout portions where the first cutout portion 24h is formed. That is, both end portions of the first cutout portion 24h in the circumferential direction are formed by the two tapered surfaces 24i and 24j. The tapered surfaces 24i and 24j extend approximately in the radial direction of the shaft 8. The tapered surfaces 24i and 24j are approximately line-symmetrical with each other as an example. Furthermore, end portions of the tapered surfaces 24i and 24j on an outer side in the radial direction extend vertically lower than the large diameter hole 24a. In other words, as an example, end portions of the tapered surfaces 24i and 24j on an inner side in the radial direction is positioned vertically lower than the center of the large diameter hole 24a. With the inner side end portion as a starting point, each of the tapered surfaces 24i and 24j extends lower than the large diameter hole 24a in the radial direction.

Referring back to FIG. 3, the seal plate portion 25 is disposed while spaced apart from the partition wall portion 24 on an opposite side of the bearing 7. A main body portion 25a of the seal plate portion 25 is annular. Of the main body portion 25a, an outer surface 25b facing the back surface 10a of the compressor impeller 10 is recessed toward the bearing 7 more on an inner side in the radial direction. The inner surface 25c of the main body portion 25a facing the partition wall portion 24 includes a region protruding toward the partition wall portion 24 toward the radially inner side on the inner diameter side. An annular protrusion 25d is formed on an end portion of the inner surface 25c on the inner side in the radial direction. The annular protrusion 25d protrudes from the inner surface 25c toward the partition wall portion 24.

A plate hole 25e is formed at the center of the annular protrusion 25d. The plate hole 25e penetrates up to the back surface 10a. The tip portion 21f of the oil thrower member 21 is inserted in the plate hole 25e. The small protrusion 21d extends from the annular protrusion 25d toward the partition wall portion 24. An enlarged diameter portion 25g is formed at an end portion 25f of the plate hole 25e on the partition wall portion 24 side. The enlarged diameter portion 25g has a larger inner diameter toward the partition wall portion 24 (the side opposite to the compressor impeller 10, the large protrusion 21b side). The inclined surface 21e of the oil thrower member 21 is facing an inner side in the radial direction of the enlarged diameter portion 25g.

As illustrated in FIGS. 4A and 4B, the middle portion 26 is positioned between the partition wall portion 24 and the seal plate portion 25 in the axial direction. The middle portion 26 is continuous to an outer circumferential surface of each of the partition wall portion 24 and the seal plate portion 25. Moreover, the middle portion 26 extends in the circumferential direction of the large diameter hole 24a. Like the partition wall portion 24, a second cutout portion 26a is formed in the middle portion 26 at a vertically lower side. The second cutout portion 26a is positioned vertically lower than the center of the large diameter hole 24a (center of the shaft 8). In the middle portion 26, two tapered surfaces 26b and 26c are formed at cutout portions where the second cutout portion 26a is formed. The tapered surfaces 26b and 26c extend in the radial direction of the shaft 8. That is, both end portions of the second cutout portion 26a in the circumferential direction are formed by the two tapered surfaces 26b and 26c. The tapered surfaces 26b and 26c are approximately line symmetric with each other as an example. Furthermore, end portions of the tapered surfaces 26b and 26c on an outer side in the radial direction extend vertically lower than the large diameter hole 24a. In other words, as an example, end portions of the tapered surfaces 26b and 26c on an inner side in the radial direction is positioned vertically lower than the center of the large diameter hole 24a. With the inner side end portion as a starting point, each of the tapered surfaces 26b and 26c extends vertically lower than the large diameter hole 24a in the radial direction The second cutout portion 26a is continuous with the first cutout portion 24h in the axial direction. In other words, the tapered surfaces 24i and 24j and the tapered surfaces 26b and 26c are continuous in the axial direction and are flush with each other as an example.

Figure 5:
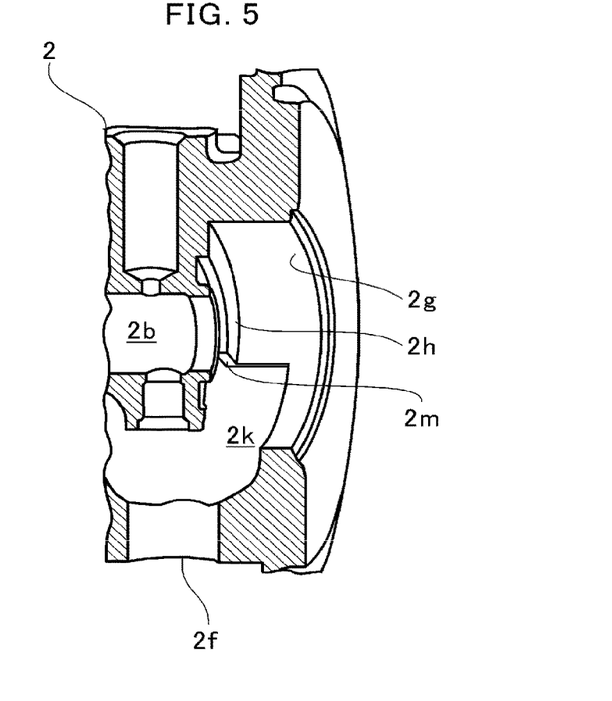
FIG. 5 is a partially extracted view of a bearing housing.

FIG. 5 is a partially extracted view of the bearing housing 2. Note that, in FIG. 5, a perspective view of the bearing housing 2 cut at the same position as that in FIG. 1 when viewed from the right front side in FIG. 1 is illustrated.

As illustrated in FIG. 5, in the bearing housing 2, a communication passage 2k communicating the accommodation hole 2g and the oil discharge port 2f is formed. A third cutout portion 2m is further formed in the bottom surface portion 2h of the accommodation hole 2g. The third cutout portion 2m is positioned vertically lower than the center of the bearing hole 2b (center of the shaft 8).

Figure 6A:
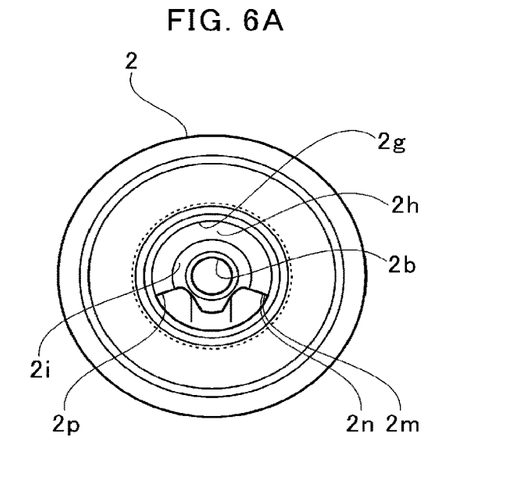
FIG. 6A is a view of the bearing housing when viewed from the right side in FIG. 5.
Figure 6B:
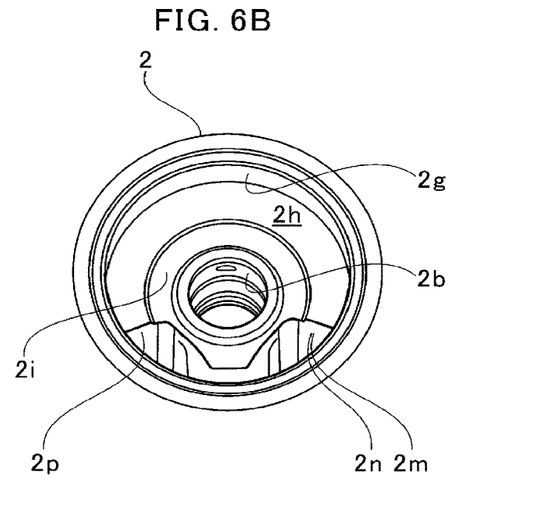
FIG. 6B is a perspective view of a broken line part of FIG. 6A when viewed from below.

FIG. 6A is a view of the bearing housing 2 when viewed from the right side in FIG. 5. FIG. 6B is a perspective view of a broken line part of FIG. 6A when viewed from below. As illustrated in FIGS. 6A and 6B, two tapered surfaces 2n and 2p are formed on the bottom surface portion 2h. The tapered surfaces 2n and 2p are formed at cutout portions where the third cutout portion 2m is formed. That is, both end portions of the third cutout portion 2m in the circumferential direction are formed by the two tapered surfaces 2n and 2p. The tapered surfaces 2n and 2p extend approximately in the radial direction of the shaft 8. The tapered surfaces 2n and 2p are approximately line symmetric with each other as an example. Furthermore, end portions of the tapered surfaces 2n and 2p on an outer side in the radial direction extend vertically lower than the large diameter hole 24a. In other words, as an example, end portions of the tapered surfaces 2n and 2p on an inner side in the radial direction is positioned vertically lower than the center of the large diameter hole 24a. With the inner side end portion as a starting point, each of the tapered surfaces 2n and 2p extends vertically lower than the large diameter hole 24a in the radial direction.

When the seal partition member 23 is disposed in the accommodation hole 2g of the bearing housing 2, the third cutout portion 2m may be continuous with the first cutout portion 24h in the axial direction. In other words, each pair of the tapered surfaces 24i and 2p and the tapered surfaces 24j and 2n may be continuous in the axial direction and be flush with each other. The present disclosure is not limited to this, and alternatively the third cutout portion 2m may extend vertically lower than the first cutout portion 24h. That is, the bottom surface portion 2h of the accommodation hole 2g extends vertically lower than the outer diameter wall portion 24f. And a step surface extending in the radial direction is formed at a connecting portion between the bottom surface portion 2h and the outer diameter wall portion 24f. In this case, this step surface enables preventing lubricating oil from entering the oil supply side (oil passage 2c side) in the axial direction.

Referring back to FIG. 3, a space S of the bearing housing 2 is formed by the accommodation hole 2g and the groove 2i illustrated in FIG. 3. The partition wall portion 24 divides the space S into two spaces Sa and Sb in the axial direction. The space Sa on the bearing 7 side is adjacent to the inclined surface 24c. Furthermore, the space Sb on the compressor impeller 10 side is formed inside the seal partition member 23 (that is, a space surrounded by the partition wall portion 24, the seal plate portion 25, and the middle portion 26). These spaces Sa and Sb communicate with the communication passage 2k via the first cutout portion 24h, the second cutout portion 26a, and the third cutout portion 2m.

The lubricating oil having lubricated the thrust bearing surface 7j scatters radially outward from the opposing surface 21a by the centrifugal force. Then, the lubricating oil flows toward the bearing 7 while flowing radially outward along the inclined surface 24c of the partition wall portion 24. The lubricating oil scattered vertically downward directly passes through the communication passage 2k and is discharged from the oil discharge port 2f. The lubricating oil scattered vertically upward flows into the groove 2i and is guided to the communication passage 2k along the groove 2i. The lubricating oil guided to the communication passage 2k is discharged from the oil discharge port 2f.

Furthermore, a part of the lubricating oil passes through a clearance between the large protrusion 21b of the oil thrower member 21 and the large diameter hole 24a of the partition wall portion 24 and flows out into the space Sb. The lubricating oil flowed out into the space Sb is scattered radially outward by the centrifugal force. The lubricating oil scattered vertically downward passes through the communication passage 2k and is discharged from the oil discharge port 2f. The lubricating oil scattered vertically upward is guided to the communication passage 2k along the inner wall surface of the middle portion 26 in the circumferential direction. The lubricating oil guided to the communication passage 2k is discharged from the oil discharge port 2f.

It is assumed that a part of the lubricating oil has entered the clearance between the inclined surface 21e of the oil thrower member 21 and the enlarged diameter portion 25g of the seal plate portion 25. In this case, due to the centrifugal force accompanying the rotation of the oil thrower member 21, the lubricating oil flows radially outward, whereby a force to pull back toward the bearing 7 is generated in the lubricating oil. Then, the lubricating oil scatters radially outward from a portion of the small protrusion 21d protruding slightly from the annular protrusion 25d toward the bearing 7. The scattered lubricating oil is discharged from the oil discharge port 2f via the communication passage 2k.

As described above, in the present embodiment, the inclined surface 24c is provided radially outside the thrust bearing surface 7j. Therefore, the lubricating oil having lubricated the thrust bearing surface 7j flows in the axial direction along the inclined surface 24c. As a result, the scattered lubricating oil hardly interferes with the flow of lubricating oil to be scattered subsequently. The lubricating oil is efficiently discharged from the space Sa to the communication passage 2k. This enables improving the oil draining property.

Further, as described above, it is assumed that the first cutout portion 24h, the second cutout portion 26a, and the third cutout portion 2m are provided. In this case, the tapered surfaces 24i and 24j, the tapered surfaces 26b and 26c, and the tapered surfaces 2n and 2p suppress winding up of the lubricating oil from the communication passage 2k. In other words, it is possible to reduce intrusion of lubricating oil toward the center of the shaft 8. Here, it is sufficient to provide any one of the first cutout portion 24h, the second cutout portion 26a, and the third cutout portion 2m; however, the present disclosure is not limited thereto. For example, a plurality of cutout portions may be provided such as including any combination of two out of the first cutout portion 24h, the second cutout portion 26a, and the third cutout portion 2m or including all the three. In this case, it is possible to synergistically suppress winding up of the lubricating oil from the communication passage 2k.

Of the small protrusions 21d, a surface on the large protrusion 21b side may be positioned closer to the large protrusion 21b (to the bearing 7) than the end surface of the annular protrusion 25d on the large protrusion 21b side. In this case, as described above, the lubricating oil is easily scattered radially outward from a portion of the small protrusion 21d protruding slightly from the annular protrusion 25d toward the bearing V. Inflow of the lubricating oil toward the ring groove 21g (seal ring not illustrated) is suppressed.

An inner wall surface 2ka is a part of the bearing housing 2. The inner wall surface 2ka forms the communication passage 2k. The inner wall surface 2ka is continuous from, for example, a communicating portion between the communication passage 2k and the accommodation hole 2g. The inner wall surface 2ka may be positioned on the compressor impeller 10 side (right side in FIG. 3) of the communication passage 2k. A plate surface 25ca is formed on the inner surface 25c of the seal plate portion 25 on an outer side in the radial direction. The plate surface 25ca may be positioned on the second cutout portion 26a side of the middle portion 26. The inner wall surface 2ka is positioned closer to the large protrusion 21b (to the bearing 7) than the plate surface 25ca is. In this case, a space Sb is widely secured. This enables improving the oil draining property.

Furthermore, the axial position of the opposing surface 21a of the oil thrower member 21 may be arranged between the axial position of the bottom surface portion 2h of the accommodation hole 2g and that of the flat surface portion 24d of the partition wall portion 24. In this case, lubricating oil scattered from the opposing surface 21a is guided to the inclined surface 24c. This enables improving the oil draining property.

The axial position of the opposite surface 21h of the oil thrower member 21 may be arranged between the axial position of the flat surface portion 24d of the partition wall portion 24 and that of the surface of the partition wall portion 24 opposite to the flat surface portion 24d (surface facing the annular protrusion 25d). In this case, an orifice is formed between the oil thrower member 21 and the partition wall portion 24. At an outlet side of the orifice, formation of mist is suppressed.

Moreover, the inner diameter of the intersection between an extension line extending radially outward from the opposing surface 21a and the inclined surface 24c may be less than an average value of the inner diameter of the inner wall surface 2ja of the groove 2i on an outer side in the radial direction (distance from the central of the shaft 8) and the inner diameter of the inner wall surface 2jb of the groove 2i on an outer side in the radial direction. In this case, the scattered lubricating oil is easily guided to the inclined surface 24c even at a low rotation speed. Even at a low rotation speed, the inclined surface 24c and the groove 2i effectively function.

In addition, as illustrated in FIG. 1, the groove 2i may be positioned right above the oil discharge port 2f. In this case, lubricating oil guided to the groove 2i can be discharged directly to the oil discharge port 2f directly below.

The radial position of the outer circumferential surface of the large protrusion 21b may be arranged between the radial position of the damper portion 7m of the bearing 7 and that of the inner wall surface 2jb of the groove 2i on an outer side in the radial direction. In this case, lubricating oil flowing out in the axial direction from the bearing 7 side tends to collides with the large protrusion 21b. Therefore, the lubricating oil is easily guided to the groove 2i.

It is preferable to design the clearance between the inner diameter of the large diameter hole 24a and the outer diameter of the large protrusion 21b to be small. In the case where the partition wall portion 24 is integrated, as a part of the seal partition member 23, with the seal plate portion 25 and the middle portion 26, for example, by press-fitting the seal partition member 23 into the accommodation hole 2g, after installation, it becomes easier to reduce a dimensional difference between the inner diameter of the large diameter hole 24a and the outer diameter of the large protrusion 21b after attachment. As a result, it is further suppressed that the lubricating oil diffuses (for example, formed into mist) and flows out from the clearance (the aforementioned orifice) between the large protrusion 21b and the large diameter hole 24a into the space Sb.

Figure 7:
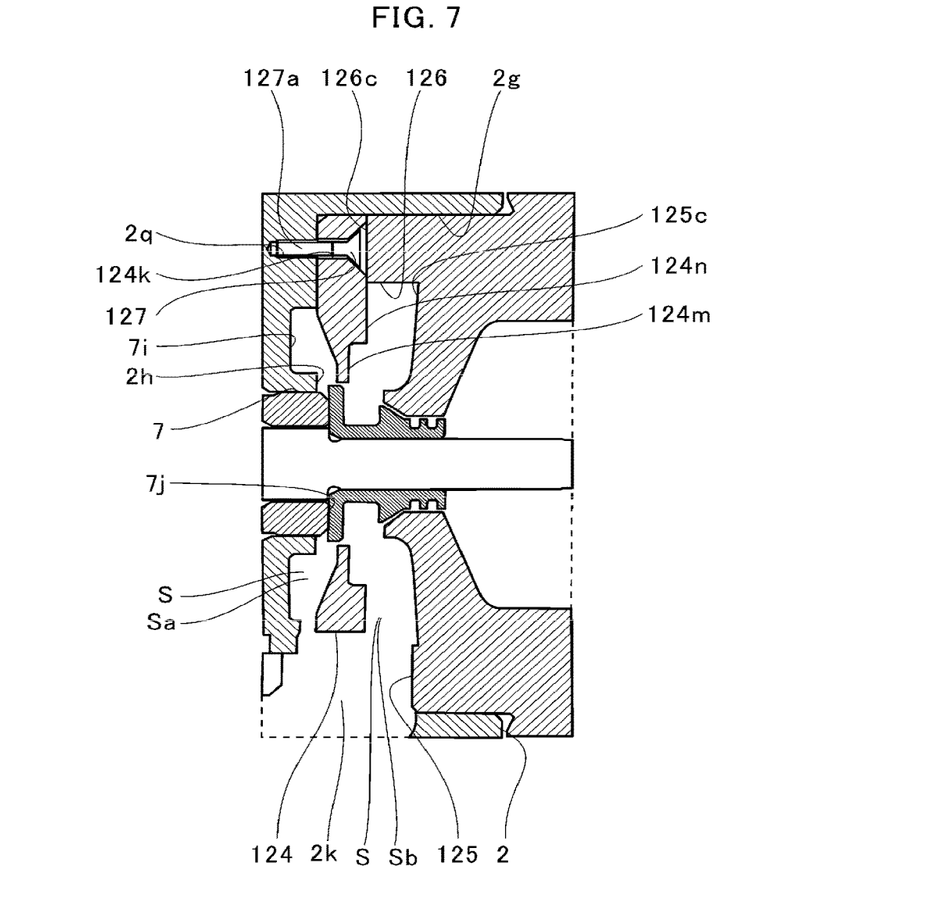
FIG. 7 is an explanatory diagram for explaining a modification.

FIG. 7 is an explanatory view for explaining a modification and illustrates a cross-sectional view of the modification at a position corresponding to that of FIG. 3. In FIG. 7, the illustration of the compressor impeller 10 is omitted. In the embodiment described above, the case where the seal partition member 23 integrally in which the partition wall portion 24, the seal plate portion 25, and the middle portion 26 are integrally formed is provided has been described. As illustrated in FIG. 7, in the modification, a partition wall portion 124 is formed separately from a seal plate portion 125 and a middle portion 126.

A screw hole 2q is provided in the bottom surface portion 2h of the bearing housing 2. The screw hole 2q is provided radially outside a groove 2i. The partition wall portion 124 includes a through hole 124k. The through hole 124k faces the screw hole 2q. The through hole 124k penetrates in the axial direction. A fastening member 127 is inserted into the through hole 124k. A screw portion 127a is formed at the tip portion of the fastening member 127. The screw portion 127a is screwed into the screw hole 2q. In this manner, the partition wall portion 124 is assembled to the bearing housing 2. The seal plate portion 125 is press-fitted into an accommodation hole 2g and thereby assembled to the bearing housing 2. Here, the case where the partition wall portion 124 is assembled to the bearing housing 2 by the fastening member 127 and the seal plate portion 125 is press-fitted into the accommodation hole 2g has been described. However, for example, the partition wall portion 124 may be assembled to the bearing housing 2 by press fitting, and the seal plate portion 125 may be assembled to the bearing housing 2 by a bolt or the like.

An opposite surface 124m is a surface of the partition wall portion 124 that faces the seal plate portion 125. On the opposite surface 124m, a protruding portion 124n is formed. The protruding portion 124n is positioned on an outer side in the radial direction of the opposite surface 124m. The protruding portion 124n protrudes toward the seal plate portion 125. A middle portion 126 protrudes from an outer circumferential side of an inner surface 125c of the seal plate portion 125 toward the partition wall portion 124. A front end surface 126c of the middle portion 126 extends in the radial direction of the shaft 8. The front end surface 126c abuts against the protruding portion 124n of the partition wall portion 124.

As in the modification, the partition wall portion 124 may be formed separately from the seal plate portion 125 and the middle portion 126. Also in this case, like in the embodiment described above, the lubricating oil having lubricated the thrust bearing surface 7j flows in the axial direction along an inclined surface 24c. Therefore, the lubricating oil flowing in the axial direction hardly interferes with the flow of the lubricating oil to be scattered subsequently. As a result, the lubricating oil is efficiently discharged from a space Sa to a communication passage 2k. This enables improving the oil draining property.

Although the embodiments have been described with reference to the accompanying drawings, it is naturally understood that the present disclosure is not limited to the above embodiments. It is clear that those skilled in the art can conceive various modifications or variations within the scope described in the claims, and it is understood that they are naturally also within the technical scope.

For example, in the modification described above, the case where the middle portion 126 is integrally formed with the seal plate portion 125 has been described. However, the middle portion may be integrally formed with the partition wall portion and be formed separately from the seal plate portion. Regardless of whether the middle portion is formed as an integrated body or a separated body, the partition wall portion requires 5-axis machining or the like for example. The degradation of workability caused by integrally forming the middle portion and the partition wall portion is suppressed. On the other hand, in the case where the middle portion is formed as a separate body, the seal plate portion does not require complex processing such as 5-axis machining. This enables improving the manufacturability. Furthermore, in assembling work of the seal plate portion, management of the position in the rotational direction of the shaft 8 becomes unnecessary. Workability is improved. However, when the middle portion 126 is integrally formed with the seal plate portion 125, it is sufficient to attach only the partition wall portion 124 to the bearing housing 2 by the fastening member 127. Therefore, for example, the middle portion may be integrally formed with the partition wall portion. In this case, the length of the fastening member 127 can be reduced by the length of the middle portion 126 as compared with the case where the fastening member penetrates through the middle portion and the partition wall portion and is screwed into the screw hole of the bearing housing 2.

Furthermore, for example, in the case where the partition wall portion 24 and the seal plate portion 25 are integrally formed as in the embodiment described above, the seal partition member 23 (the partition wall portion 24 and the seal plate portion 25) can be formed by, for example, casting or the like. Therefore, complicated machining such as 5-axis machining becomes unnecessary. This enables improving the manufacturability. In addition, the partition wall portion 24 and the seal plate portion 25 can be assembled into the accommodation hole 2g together. Workability is improved. Furthermore, with the partition wall portion 24 abutting against the bottom surface portion 2h, the entire position of the seal partition member 23 is determined. Stability of assembly is improved. Furthermore, it is sufficient to assemble the seal plate portion 25 to the bearing housing 2 without directly assembling the partition wall portion 24 to the bearing housing 2. The through hole 124k or the screw hole 2q become unnecessary. Therefore, it is possible to improve the oil draining property by expanding the groove 2i radially outward, for example, to the same position as that of an inner circumferential surface of the middle portion 26. Furthermore, for example, another cutout portion may be provided in the middle portion 26 on the side opposite to the first cutout portion 24h (for example, on an upper side in the vertical direction) as long as the strength of the middle portion 26 can be maintained on the minimum level. In other words, it is only required to prevent winding up of the lubricating oil by the tapered surfaces 24i and 24j of the first cutout portion 24h. Since a portion vertically above the tapered surfaces 24i and 24j is for maintaining the strength of the middle portion 26, a cutout portion may be provided. In this case, it is possible to reduce the weight and material cost. It is possible to secure the space Sb to be wide and to improve the oil draining property.

Furthermore, in the modification described above, the case where the protruding portion 124n is formed on the opposite surface 124m of the partition wall portion 124 has been described. However, the protruding portion 124n may not be formed on the opposite surface 124m.

Furthermore, in the embodiment and the modification described above, the case where the first cutout portion 24h, the second cutout portion 26a, and the third cutout portion 2m are provided has been described. However, the first cutout portion 24h, the second cutout portion 26a, and the third cutout portion 2m may not be provided.

Furthermore, in the embodiment and the modification described above, the case where each pair of the tapered surfaces 24i and 24j, the tapered surfaces 26b and 26c, and the tapered surfaces 2n and 2p are arranged approximately line-symmetrically with each other has been described. However, each pair of the tapered surfaces 24i and 24j, the tapered surfaces 26b and 26c, and the tapered surfaces 2n and 2p may be provided at least in only a region positioned from vertically below the shaft 8 to the forward side in the rotation direction. For example, in the case where the shaft 8 is rotating in a clockwise direction when viewed from the compressor impeller 10, provided is a cutout portion extending in the circumferential direction from vertically below to the tapered surfaces (24i, 26b, and 2p) positioned on the left side in FIG. 4B. However, in the case where each pair of the tapered surfaces 24i and 24j, the tapered surfaces 26b and 26c, and the tapered surfaces 2n and 2p is arranged approximately line-symmetrically with each other, this can be commonly applied also to a turbocharger including a shaft 8 that rotates in the opposite direction. In this case, it is possible to omit provision of two members depending on a rotation direction of the shaft 8.

Furthermore, in the embodiment and the modification described above, the case where the tapered surfaces 24i and 24j, the tapered surfaces 26b and 26c, and the tapered surfaces 2n and 2p extend in the radial direction of the shaft 8 has been described. However, the present disclosure is not limited to this. Inclination angles of the tapered surfaces 24i and 24j, the tapered surfaces 26b and 26c, and the tapered surfaces 2n and 2p can be set desirably. Furthermore, for example, inclination angles of the tapered surfaces 24i and 24j, the tapered surfaces 26b and 26c, and the tapered surfaces 2n and 2p may vary in the radial direction. The tapered surfaces 24i and 24j, the tapered surfaces 26b and 26c, and the tapered surfaces 2n and 2p may be curved.

Furthermore, in the embodiment and the modification described above, the case where the end portions of the tapered surfaces 24i and 24j, the tapered surfaces 26b and 26c, and the tapered surfaces 2n and 2p on an outer side in the radial direction extend vertically lower than the large diameter hole 24a has been described. However, the positions of the lower ends of the tapered surfaces 24i and 24j, the tapered surfaces 26b and 26c, and the tapered surfaces 2n and 2p in the radial direction may be the same as that of the large diameter hole 24a. However, the positions of the lower ends of the tapered surfaces 24i and 24j, the tapered surfaces 26b and 26c, and the tapered surfaces 2n and 2p in the radial direction may be vertically upper than that of the large diameter hole 24a. However, in the case where the end portions of the tapered surfaces 24i and 24j, the tapered surfaces 26b and 26c, and the tapered surfaces 2n and 2p on an outer side in the radial direction extend vertically lower than the large diameter hole 24a, winding up of the lubricating oil from the communication passage 2k can be efficiently suppressed. Similarly, end portions of the tapered surfaces on an inner side in the radial direction (starting point side) is not limited to be positioned vertically lower than the center of the large diameter hole 24a. For example, the end portions on the inner side in the radial direction may be positioned at the same position in the vertical direction as that of the large diameter hole 24a as long as the thickness of a wall surface with the large diameter hole 24a or the bearing hole 2b can be ensured in terms of strength. The end portions of the tapered surfaces on an inner side in the radial direction (starting point side) may be positioned vertically upper than the large diameter hole 24a.

Furthermore, in the embodiment and the modification described above, the case where the opposing surface 21a of the large protrusion 21b is positioned closer to the bearing 7 than the large diameter hole 24a is has been described. The shaft 8 or the oil thrower member 21 move in the axial direction with respect to the bearing housing 2 by a thrust load (axial force) generated during operation. For example, assuming that a thrust load is generated in a direction in which the shaft 8 or the oil thrower member 21 moves toward the compressor impeller 10. In this case, the large diameter portion 8a of the shaft 8 moves to a position where the large diameter portion 8a approximately abuts against the bearing 7. Assuming that a thrust load is generated in a direction in which the shaft 8 or the oil thrower member 21 moves toward the turbine impeller 9. In this case, the opposing surface 21a of the oil thrower member 21 moves to a position where the opposing surface 21a approximately abuts against the bearing 7. Here, the opposing surface 21a of the large protrusion 21b may be positioned closer to the bearing 7 side than the large diameter hole 24a is even when the shaft 8 or the oil thrower member 21 move toward the compressor impeller 10. In this case, the inclined surface 24c is arranged so as to be always positioned radially outside the thrust bearing surface 7j. In this manner, regardless of the direction in which the thrust load acts on the shaft 8, it is possible to stably improve the oil draining property.

Furthermore, in the embodiment and the modification described above, the case where the inner circumferential surface 24b of the large diameter hole 24a is positioned on an outer side in the radial direction of the opposite surface 21h of the large protrusion 21b has been described. However, the inner circumferential surface 24b of the large diameter hole 24a may not be positioned radially outside the opposite surface 21h of the large protrusion 21b. For example, the opposite surface 21h of the large protrusion 21b may be positioned closer to the seal plate portion 25 or 125 than the inner circumferential surface 24b of the large diameter hole 24a is. Furthermore, the opposite surface 21h of the large protrusion 21b may be positioned radially inward from an end portion of the inner circumferential surface 24b of the large diameter hole 24a on the seal plate portion 25 or 125 side. Note that in the case where the inner circumferential surface 24b of the large diameter hole 24a is positioned radially outside the opposite surface 21h of the large protrusion 21b, the following effects are obtained. That is, it is suppressed that the lubricating oil diffuses (for example, formed into mist) and flows out from the clearance (the aforementioned orifice) between the large protrusion 21b and the large diameter hole 24a into the space Sb. This enables improving the oil draining property. Moreover, the inner circumferential surface 24b of the large diameter hole 24a may be arranged so as to be always positioned on an outer side in the radial direction of the opposite surface 21h of the large protrusion 21b even when the shaft 8 or the oil thrower member 21 moves in the axial direction toward the compressor impeller 10 during operation. In this case, regardless of the direction in which the thrust load acts on the shaft 8, it is possible to stably improve the oil draining property.

Furthermore, in the embodiment and the modification described above, the case where the small protrusion 21d extends closer to the partition wall portion 24 or 124 than the annular protrusion 25d is has been described. However, the small protrusion 21d may extend to the same position as that of the annular protrusion 25d toward the partition wall portion 24 or 124. The annular protrusion 25d may extend closer to the partition wall portion 24 or 124 than the small protrusion 21d is. In the case where the small protrusion 21d extends closer to the partition wall portion 24 or 124 than the annular protrusion 25d is, the lubricating oil is easily scattered radially outward by the centrifugal force from the small protrusion 21d. This enables improving the oil draining property. Furthermore, the small protrusions 21d may be arranged so as to always extend closer to the partition wall portion 24 or 124 than the annular protrusion 25d is even when the shaft 8 or the oil thrower member 21 moves in the axial direction toward the compressor impeller 10 during operation. In this case, regardless of the direction in which the thrust load acts on the shaft 8, it is possible to stably improve the oil draining property.

Furthermore, in the embodiment and the modification described above, the case where the groove 2*i* is formed in the bottom surface portion 2*h* has been described. However, the groove 2*i* may not be provided in the bottom surface portion 2*h*. In the case where the groove 2*i* is formed in the bottom surface portion 2*h*, the lubricating oil flowed toward the bearing 7 along the inclined surface 24*c* is efficiently guided to the communication passage 2*k*. For example, even in the case where a space that can be formed with respect to the bearing 7 on an inner side in the radial direction of the inclined surface 24*c* is limited, the oil draining property can be improved.

Furthermore, in the embodiment and the modification described above, the case where the oil discharge port 2*f* is positioned on the imaginary extension line La in contact with the outer diameter end portion 24*e* of the inclined surface 24*c* positioned vertically lower than the shaft 8 have been described. However, the oil discharge port 2*f* may be at a position deviated from the imaginary extension line La of the inclined surface 24*c*. In the case where the oil discharge port 2*f* is positioned on the imaginary extension line La of the inclined surface 24*c*, a part of the lubricating oil is directly guided from the outer diameter end portion 24*e* to the oil discharge port 2*f*. This enables improving the oil draining property.

Furthermore, in the embodiment and the modification described above, the case where a cross-sectional shape of the inclined surface 24*c* illustrated in FIG. 3 is linear has been described. However, in the cross-section illustrated in FIG. 3, the inclined surface is not limited to be linear and may be curved, for example. Even in this case, as long as the oil discharge port 2*f* is positioned on an imaginary extension line in contact with the outer diameter end portion of the inclined surface, a part of the lubricating oil is directly guided from the outer diameter end portion to the oil discharge port 2*f*. This enables improving the oil draining property.

Furthermore, in the embodiment and the modification described above, the case where the partition wall portions 24 and 124, the seal plate portions 25 and 125, and the middle portions 26 and 126 are arranged on the compressor impeller 10 side with respect to the bearing 7 has been described. However, the partition wall portions 24 and 124, the seal plate portions 25 and 125, and the middle portions 26 and 126 may be arranged on the turbine impeller 9 side with respect to the bearing 7.

INDUSTRIAL APPLICABILITY

The present disclosure can be applied to a turbocharger including a bearing having a thrust bearing surface.

What is claimed is:
1. A turbocharger comprising:
a housing;
a bearing disposed in the housing and having a thrust bearing surface;
a partition wall portion assembled to the housing, the partition wall portion including an inclined surface positioned on an outer side in a radial direction of the thrust bearing surface, extending at least vertically above the thrust bearing surface, and inclined with respect to a direction perpendicular to an axial direction of a shaft; and
a groove formed in the housing and facing the inclined surface in the axial direction of the shaft.

2. The turbocharger according to claim 1, further comprising a seal plate portion,
wherein the bearing is located relative to one side of the partition wall portion, and the seal plate portion is located relative to another side of the partition wall portion, and the seal plate portion is axially spaced apart from the partition wall portion.

3. The turbocharger according to claim 2, further comprising:
a middle portion provided between the partition wall portion and the seal plate portion; and
a second cutout portion formed in the middle portion in a vertically lower side lower than a center of the shaft.

4. The turbocharger according to claim 2, wherein the partition wall portion and the seal plate portion are integrally formed.

5. The turbocharger according to claim 4, further comprising:
a middle portion provided between the partition wall portion and the seal plate portion; and
a second cutout portion formed in the middle portion in a vertically lower side lower than a center of the shaft.

6. The turbocharger according to claim 1, further comprising:
an outer diameter wall portion extending outward in the radial direction from the inclined surface in the partition wall portion; and
a first cutout portion formed on a vertically lower side lower than a center of the shaft in the outer diameter wall portion.

7. The turbocharger according to claim 6, further comprising a seal plate portion,
wherein the bearing is located relative to one side of the partition wall portion, and the seal plate portion is located relative to another side of the partition wall portion, and the seal plate portion is axially spaced apart from the partition wall portion.

8. The turbocharger according to claim 1, further comprising an oil discharge port formed in the housing and positioned on an imaginary extension line in contact with an outer diameter end portion of the inclined surface positioned vertically below the shaft.

9. The turbocharger according to claim 8, further comprising a seal plate portion,
wherein the bearing is located relative to one side of the partition wall portion, and the seal plate portion is located relative to another side of the partition wall portion, and the seal plate portion is axially spaced apart from the partition wall portion.

10. The turbocharger according to claim 8, further comprising:
an outer diameter wall portion extending outward in the radial direction from the inclined surface in the partition wall portion; and
a first cutout portion formed on a vertically lower side lower than a center of the shaft in the outer diameter wall portion.

11. The turbocharger according to claim 10, further comprising a seal plate portion,
wherein the bearing is located relative to one side of the partition wall portion, and the seal plate portion is located relative to another side of the partition wall portion, and the seal plate portion is axially spaced apart from the partition wall portion.

12. The turbocharger according to claim 1,
wherein the inclined surface is inclined in such a direction as to extend radially outward toward the bearing.

13. The turbocharger according to claim 12, further comprising a seal plate portion,
wherein the bearing is located relative to one side of the partition wall portion, and the seal plate portion is located relative to another side of the partition wall portion, and the seal plate portion is axially spaced apart from the partition wall portion.

14. The turbocharger according to claim 12, further comprising:
an outer diameter wall portion extending outward in the radial direction from the inclined surface in the partition wall portion; and
a first cutout portion formed on a vertically lower side lower than a center of the shaft in the outer diameter wall portion.

15. The turbocharger according to claim 14, further comprising a seal plate portion,
wherein the bearing is located relative to one side of the partition wall portion, and the seal plate portion is located relative to another side of the partition wall portion, and the seal plate portion is axially spaced apart from the partition wall portion.

16. The turbocharger according to claim 12, further comprising an oil discharge port formed in the housing and positioned on an imaginary extension line in contact with an outer diameter end portion of the inclined surface positioned vertically below the shaft.

17. The turbocharger according to claim 16, further comprising a seal plate portion,
wherein the bearing is located relative to one side of the partition wall portion, and the seal plate portion is located relative to another side of the partition wall portion, and the seal plate portion is axially spaced apart from the partition wall portion.

18. The turbocharger according to claim 16, further comprising:
an outer diameter wall portion extending outward in the radial direction from the inclined surface in the partition wall portion; and
a first cutout portion formed on a vertically lower side lower than a center of the shaft in the outer diameter wall portion.

19. The turbocharger according to claim 18, further comprising a seal plate portion,
wherein the bearing is located relative to one side of the partition wall portion, and the seal plate portion is located relative to another side of the partition wall portion, and the seal plate portion is axially spaced apart from the partition wall portion.

* * * * *